(12) United States Patent
Nathanson et al.

(10) Patent No.: US 6,505,576 B2
(45) Date of Patent: Jan. 14, 2003

(54) PET TOY

(75) Inventors: Barbara Nathanson, 235 E. 22nd St., #4N, New York, NY (US) 10010; Jean Kersaint, New York, NY (US)

(73) Assignee: Barbara Nathanson, New York, NY (US)

( * ) Notice: Subject to any disclaimer, the term of this patent is extended or adjusted under 35 U.S.C. 154(b) by 0 days.

(21) Appl. No.: 09/809,132

(22) Filed: Mar. 15, 2001

(65) Prior Publication Data

US 2001/0037773 A1 Nov. 8, 2001

Related U.S. Application Data

(60) Provisional application No. 60/189,663, filed on Mar. 15, 2000.

(51) Int. Cl.$^7$ ................................................ A01K 15/02
(52) U.S. Cl. ..................................................... 119/702
(58) Field of Search ............................... 119/702, 707, 119/708; 362/282, 259, 287, 35, 322

(56) References Cited

U.S. PATENT DOCUMENTS

| | | | | |
|---|---|---|---|---|
| 4,285,028 A | * | 8/1981 | Sudin et al. ................. | 362/234 |
| 4,499,855 A | | 2/1985 | Galkiewicz | |
| 4,890,208 A | * | 12/1989 | Izenour ....................... | 359/889 |
| 4,960,075 A | | 10/1990 | Klatt | |
| 4,972,305 A | * | 11/1990 | Blackburn .................... | 362/234 |
| 5,041,947 A | * | 8/1991 | Yuen et al. ................... | 345/31 |
| 5,080,042 A | | 1/1992 | Rubin | |
| 5,111,771 A | | 5/1992 | Mathews | |
| 5,253,000 A | * | 10/1993 | Stoeckner .................... | 353/46 |
| 5,324,224 A | * | 6/1994 | Anderson et al. ............ | 362/184 |
| 5,333,102 A | * | 7/1994 | Oberman et al. ........... | 362/272 |
| 5,367,349 A | * | 11/1994 | Zeiler .......................... | 353/43 |
| 5,390,629 A | | 2/1995 | Simone | |
| 5,443,036 A | * | 8/1995 | Amiss et al. ................. | 119/707 |
| 5,611,297 A | | 3/1997 | Veloce | |
| 5,657,721 A | | 8/1997 | Mayfield et al. | |
| 5,806,465 A | | 9/1998 | Baiera et al. | |
| 5,924,387 A | | 7/1999 | Schramer | |
| 5,934,223 A | | 8/1999 | Ellery-Guy | |
| 6,000,820 A | | 12/1999 | Murray | |
| 6,036,337 A | * | 3/2000 | Belfer ......................... | 362/257 |
| 6,113,252 A | * | 9/2000 | Arlitt et al. .................. | 362/268 |
| 6,227,931 B1 | * | 5/2001 | Shackelford ................. | 434/156 |
| 6,283,603 B1 | * | 9/2001 | Lin .............................. | 362/286 |

* cited by examiner

*Primary Examiner*—Peter M. Poon
*Assistant Examiner*—Kevin Jakel
(74) *Attorney, Agent, or Firm*—Fay, Sharpe, Fagan, Minnich & McKee, LLP

(57) ABSTRACT

A pet toy that projects a moving light beam in various directions to entertain a pet is provided. The pet toy comprises a hollow housing having an upper opening and a lower opening. A domed cover is pivotally attached to the housing and capable of closing the upper opening. The domed cover has a reflective material on an underside thereof. A light source is operatively received within the housing and capable of producing a beam of light directed upward through the upper opening. An electric motor is operatively received within the housing and capable of moving the light source. A power source is operatively received within the housing for powering the light source and the electric motor. A switch is located on the housing and movable to an on position allowing the power source to power the light source and/or the electric motor and an off position for preventing the power source from powering the light source and/or the electric motor. In a preferred form, the switch is generally biased toward the on position but is forced to and maintained in the off position when the domed cover is closed against the housing.

20 Claims, 3 Drawing Sheets

PET TOY

CROSS-REFERENCE TO RELATED APPLICATION

This application claims the benefit of and hereby expressly incorporates by reference U.S. Provisional Application Serial No. 60/189,663, filed on Mar. 15, 2000.

BACKGROUND OF THE INVENTION

The present invention relates to a pet toy and, more particularly, to a new and improved automated pet toy that projects a moving light beam in various directions to entertain a pet. The present invention finds particular application as a timer-controlled, switch-activated automated moving light beam and is described herein with particular reference thereto. However, it is to be appreciated that the present invention is also amenable to other applications.

It is well known that domestic pets enjoy chasing moving objects. For example, cats are known to chase a piece of moving string and dogs are known to chase a ball. Similarly, cats and dogs are known chase the projected red dot of a laser pointer when the red dot projected by the laser pointer is moved across a room or area by a person. Although such an activity may entertain pets for a lengthy period of time, heretofore, a person was required to continuously move the laser pointer around the room or area to keep the red dot moving.

The present invention provides a new and improved automated moving light beam for entertaining pets that only requires a person to initially actuate the device.

BRIEF SUMMARY OF THE INVENTION

In accordance with the present invention, a light toy is provided that projects a moving light beam in various directions for entertainment. The light toy comprises a hollow housing having an upper opening and a lower opening. A domed cover is pivotally attached to the housing and capable of closing the upper opening. The domed cover has a reflective material on an underside thereof. A light source is operatively received within the housing and capable of producing a beam of light directed upward through the upper opening. An electric motor is operatively received within the housing and capable of moving the light source. A power source is operatively received within the housing for powering the light source and the electric motor. A switch is located on the housing and movable to an on position, allowing the power source to power the light source and/or the electric motor and an off position for preventing the power source from powering the light source and/or the electric motor. In a preferred form, the switch is generally biased toward the on position but is forced to and maintained in the off position when the domed cover is closed against the housing.

A main advantage of the present invention resides in the provision of a pet toy that projects a moving light beam in various directions without manual assistance.

Another primary advantage of the present invention is the provision of a pet toy that entertains pets while only requiring a human to initially actuate the device.

A further advantage of the present invention is the provision of a pet toy that automatically shuts-off to prevent drainage of a power source used to power the device.

Still other advantages and benefits of the invention will be apparent to those skilled in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE INVENTION

Figure 1:
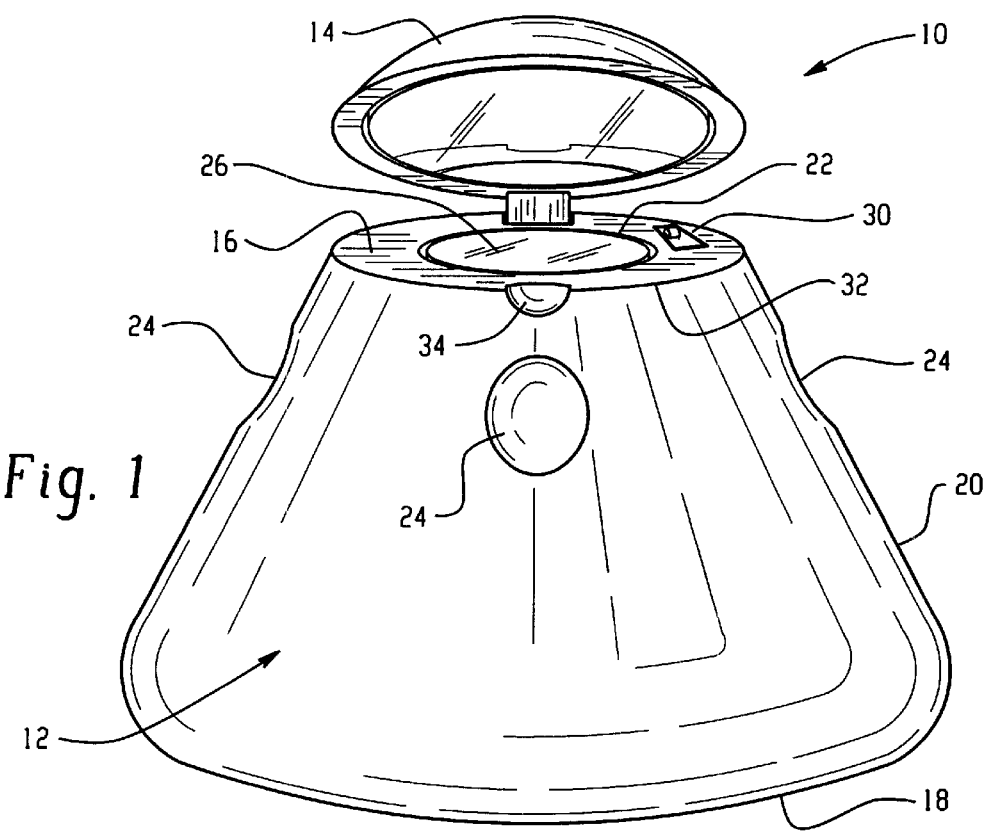
FIG. 1 is a front elevational view of a pet toy in accordance with the present invention.
Figure 2:
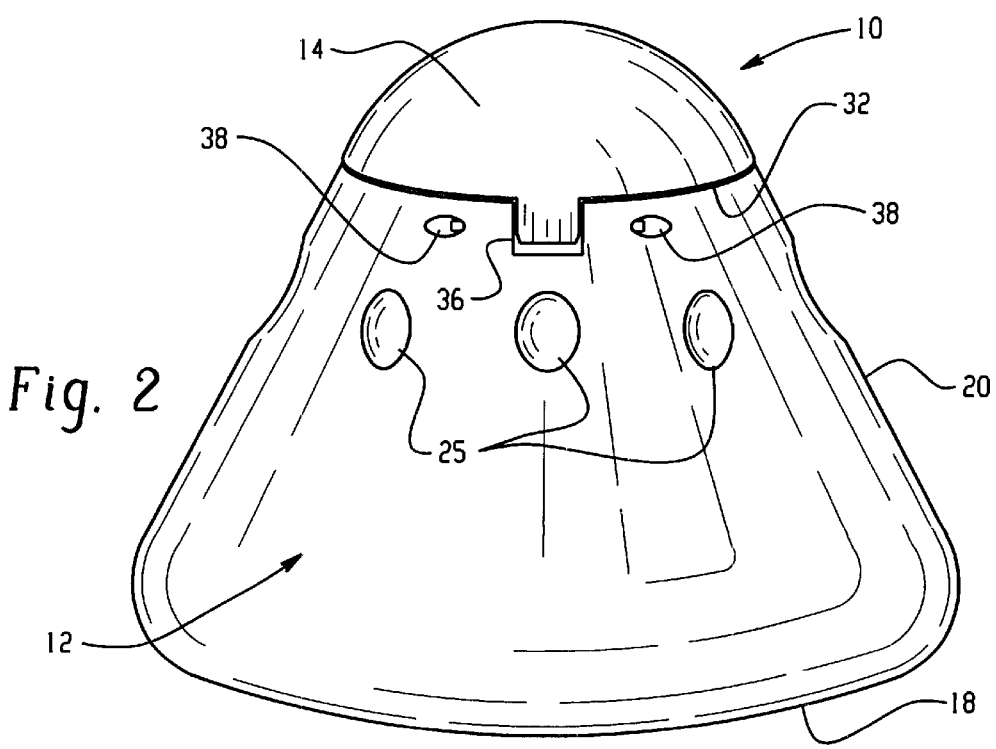
FIG. 2 is a rear elevational view of the pet toy of FIG. 1.

With reference to FIGS. 1 and 2, a pet toy 10 comprises a tapered cylindrical housing 12 and a domed cover 14. Both the housing 12 and the cover 14 are constructed of plastic in the preferred embodiment. Of course, any suitable material and method of manufacture can be used. The frustoconically shaped and hollow cylindrical housing 12 comprises a top wall 16, a bottom wall 18, and a body wall 20 extending therebetween.

The top wall 16 includes a counterbored circular opening 22 that leads into a cavity located inside the housing 12 and defined by the walls 16, 18, 20 of the housing 12. A round instrument glass piece 26 is positioned snugly on the counterbored edge 28 of the counterbored opening 22. A plurality of thumb indentations 24 (FIG. 1) and finger indentations 25. (FIG. 2) are positioned on the body wall 20 for ease of carrying the pet toy 10. Additionally, the top wall 16 includes a switch recess 30.

A peripheral edge 32 is defined by the intersection of the top wall 16 and the body wall 20. A concave thumb notch 34 is cut into the top wall 16 and the body wall 20 along the peripheral edge 32 at a front portion thereof. A connector notch 36 is cut into the top wall 16 and the body wall 20 along the peripheral edge 32 at a rear portion thereof and opposite the thumb notch 34. On both sides of the connector notch 36, a pair of opposing pin recesses 38 are disposed.

Figure 3:
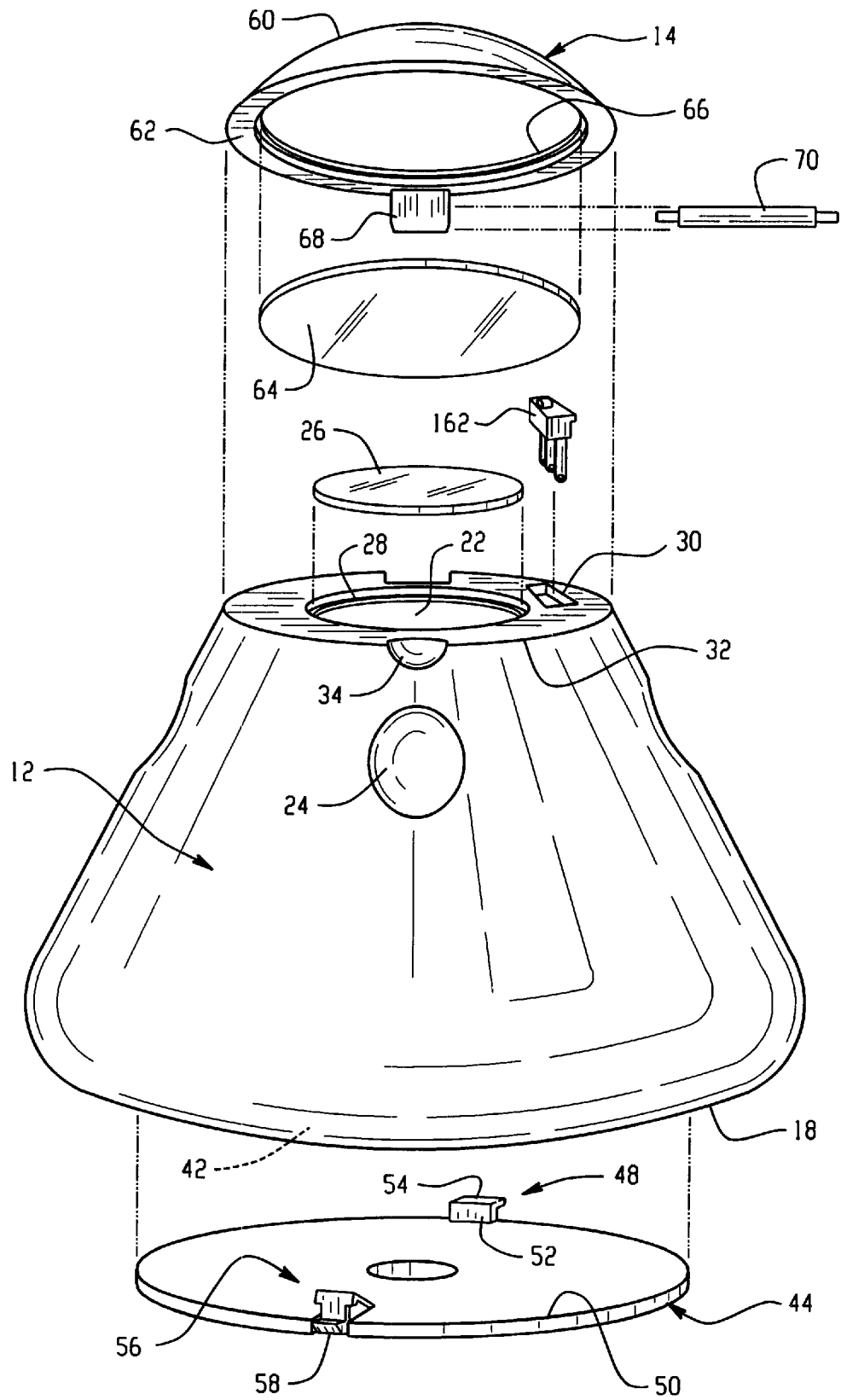
FIG. 3 is an assembly view of the pet toy of FIG. 1 showing a domed cover, a housing, and a bottom cover.

With additional reference to FIG. 3, the bottom wall 18 includes a counterbored bottom opening 42 that connects to the cavity of the housing 12. A base cover 44 fits snugly within a counterbored edge (not shown) of the bottom opening 42. The bottom cover 44 includes a latch 48 disposed near a peripheral edge 50 of the base cover 44. The latch 48 is L-shaped having a bottom latch portion 52 extending upwardly from the base cover 44 and upper latch portion 54 normal to the bottom latch portion 52 and extending radially outwardly from the bottom latch portion 52. A spring lock 56 is disposed along the peripheral edge 50 of the base cover 44 and is positioned one-hundred and eighty degrees opposite from the latch 48. The spring lock 56 includes a detent 58 that is selectively movable between a resting position wherein the detent 58 protrudes radially outwardly relative to the peripheral edge 50 of the base cover 44 and a compressed position wherein the detent 58 does not protrude beyond the peripheral edge 50 of the base cover 44. Together, the latch 48 and the spring lock 56 allow the base cover 44 to be removably secured to the bottom wall 18 of the housing 12 closing the bottom opening 42.

Alternatively, the bottom wall 18 may include only a battery compartment cover that slides or pivots open to allow for replacement of batteries used to power the toy 10 such as found on conventional battery powered devices. In this arrangement, there would not be a need for the base cover 44.

The domed cover 14 includes a rounded top side 60 and a substantially flat underside 62. A rounded mirror 64 is received in a counterbored opening 66 located on the flat underside 62 of the domed cover 14. The domed cover 14 connects to the cylindrical housing 12 by a hinged connection comprising a pin receptor 68 and a pin 70. The pin receptor 68 is an elongated tubular structure that connects at or near a peripheral edge 32 of the domed cover 14. The pin 70 is positioned within the pin receptor 68 and engages the pin recesses 38 of the housing 12 to pivotally secure the domed cover 14 to the housing 12.

Figure 4:
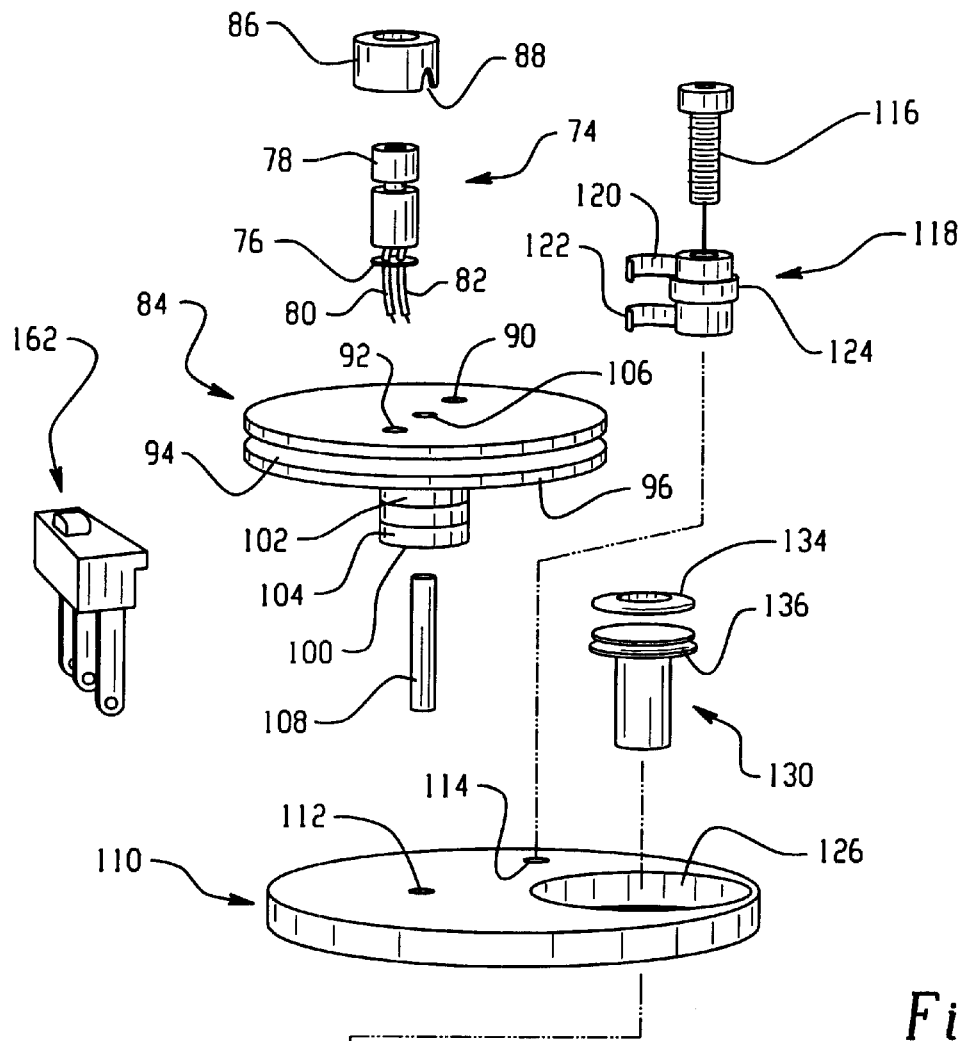
FIG. 4 is an assembly view of a light source, an electric motor, a power source, and mechanical connections therebetween received within the housing of FIG. 3.
Figure 4:
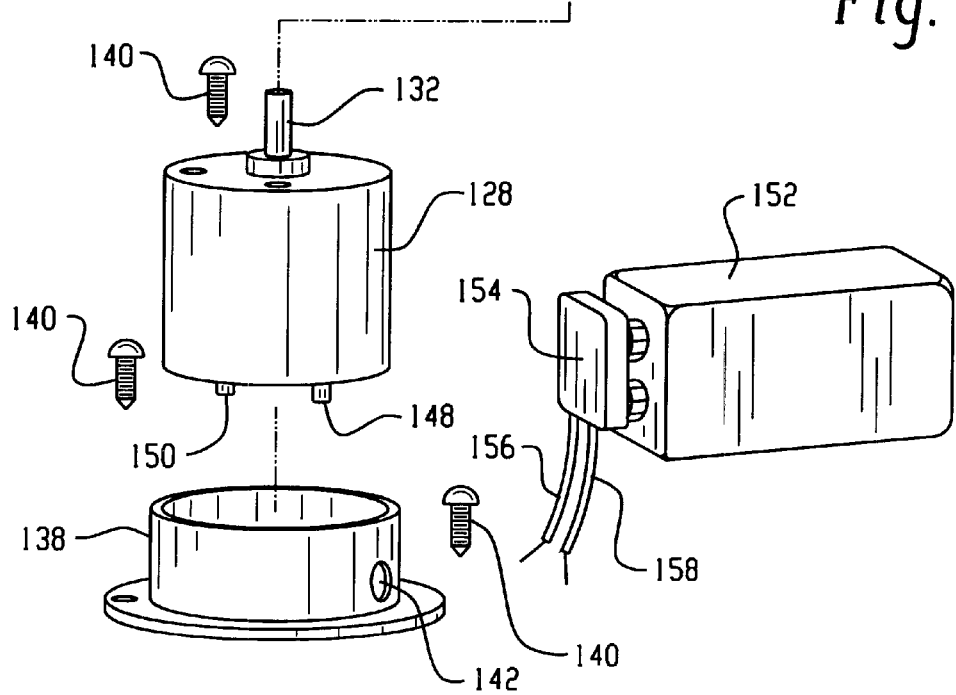

With additional reference to FIG. 4, a light source 74 is received within the cavity of the housing 12. In the preferred embodiment, the light source 74 is an LED light. However, the light source 74 may be any other suitable lighting such as a laser light or the like. The light source 74 comprises a regulating circuit board 76 for creating a light beam, an adjustable top 78 for adjusting the width of the light beam, and a pair of leads 80,82 for powering the light source 74.

The light source 74 is supported on a rotating disc platform 84 and surrounding by a cylindrical support collar 86. The leads 80,82 pass through a port 88 located in a side of the supporting collar 86 and connect to terminals 90,92 on a top side of the rotating disc platform 84. The rotating disc platform 84 includes a groove 94 along a radial edge 96 thereon for receiving a rubber ring (not shown). On an underside of the rotating disc platform 84, a cylindrical extension member 100 extends downward and holds a pair of lead contact rings 102,104 thereon.

A hole 106 extends through an axial center of the rotating disc platform 84 from the top side to the underside and through the extension member 100. The hole 106 receives a pin member 108 for rotatably connecting the rotating disc platform 84 to a base plate 110. A pin recess 112 is disposed on an upper surface of the base plate 110 for receiving the pin member 108.

The base plate 110 also includes a terminal recess 114 on the upper face thereof. A bolt screw 116 connects a contact terminal 118 to the base plate 110 by screwing into the terminal recess 114. The contact terminal 118 includes positive and negative leads 120,122 separated by an insulator 124. The position of the terminal recess 114 relative to the pin recess 112 allows for contact between the terminal leads 120,122 and corresponding lead contact rings 102,104 of the rotating disc platform 84 while causing minimal frictional drag on the extended member 100 of the rotating disc platform 84.

The base plate 110 includes a mounting hole 126 for securing the disc platform 84 to an electric motor 128. More specifically, a pulley member 130 fastens securely onto a shaft 132 of the motor 128 and sandwiches the base plate 110 securely therebetween. The pulley member 130 securely carries a friction ring 134 in a channel 136 thereon. The pin recess 112 is positioned relative to the mounting hole 126 such that the friction ring 134 is in frictional engagement with the rubber ring of the rotating disc platform 84. Thus, if the pulley member 130 and its frictional ring 134 rotate, the frictional contact between the friction ring 134 and the rubber ring will cause the rotating disc platform 84 to rotate.

The electric motor 128 is secured in place by a supporting collar 138. The supporting collar 138 is secured to the housing 12 via screws 140. The supporting collar 138 includes a connector port 142 through which a pair of motor leads (not shown) connected to motor terminals 148,150 pass. When the electric motor 128 is powered, the motor shaft 132 will rotate and, in turn, the pulley member 130 will rotate and cause rotation of the rotating disc platform 84 as described above.

Power for the motor 128 and the light source 74 derives from a conventional battery 152. Of course, other power sources could be used such as conventional AC power or other battery arrangements. The battery 152 is removably secured within a portion of the cavity by means of a conventional battery mounting bracket (not shown). The battery 152 is accessible, for replacement, by removing the base cover 44 from the housing 12. A battery terminal connector 154 connects a pair of battery leads 156,158 from the battery 152 to a printed circuit board (not shown) with a microswitch 162 connected therebetween. The microswitch 162 toggles between an off position where power is prevented from reaching the circuit board and an on position where power freely passes to the circuit board.

The printed circuit board can include a fixed voltage regulator chip for reducing the voltage produced by the battery 152 to a suitable voltage when necessary. The circuit board also includes a timer circuit comprising a timer chip, a resistor, and an electrolytic capacitor. The timer chip is in electrical communication with the leads 120,122 of the contact terminal 118, thus, providing power to the light source 74.

The circuit board further includes magnetic reed relay energized by the timer chip for supplying power to an oscillator chip. The oscillator chip is connected to a resistor and capacitor for determining a frequency thereof. The oscillator chip drives a miniature relay for supplying current pulses to the electric motor 128 via the motor terminals 148,150 and thereby moving the rotational position of the light source 74. All of the relay inputs are filtered by a pair of miniature capacitors and a switching diode combination to absorb any voltage spikes generated by collapsing magnetic fields of relay coils.

To operate the pet toy 10, a user opens the domed cover 14 allowing the microswitch 162 to move to the on position. More particularly, the microswitch 162 is normally bias toward the on position. However, when the domed cover 14 is closed against the housing 12, the domed cover 14 acts on the microswitch 162 and causes the microswitch 162 to move to and remain in the off position. When the domed cover 14 is open, the microswitch 162 is free to move to the on position.

With the microswitch 162 in the on position, power from the battery 152 flows to the circuit board. The timer circuit permits voltage to flow continuously therethrough for a predefined period of time, such as fifteen minutes. Of course, the predefined period of time may vary depending upon the precise components of the timer circuit and arrangement thereof.

If the microswitch 162 remains in the on position for the predefined period of time, the timer circuit acts to disrupt the flow of electricity to the light source 74 and the electric motor 128. The timer circuit will not allow electricity to pass until the microswitch 162 is reset, i.e., moved to the off position. Moving the microswitch 162 to the off position may be accomplished manually or by closing the domed cover 14. In the off position, the microswitch 162 prevents electricity from flowing to the timer circuit allowing it to reset for the next time the microswitch 162 is moved to the on position.

When the microswitch 162 is in the on position and the timer circuit allows electricity to pass therethrough, the light source 74 is actuated. Further, current pulses are generated and sent to the electric motor 128 via the oscillator chip and associated relays to intermittently drive the motor 128 thereby moving the light source 74. In a preferred form, the motor 128 rotates the lights source 74 and, at random intervals, the motor 128 stops and pauses before resuming rotation of the light source 74. In this manner, the light beam generated by the light source 74 rotates in a radially outward direction from the pet toy 10 while periodically making random stops. Thus, a pet is entertained by the rotating light beam generated by the pet toy 10 that varies its pattern of rotating and stopping.

In an alternate embodiment of the present invention, the domed cover 14 includes a locking pivotal connector that secures the domed cover 14 to the housing 12. The locking pivotal connector replaces the pin 70 and pin receptor 68 connection. The locking pivotal connector is configured to allow the domed cover 14 to remain open at various angles or degrees without human assistance. The locking pivotal connector permits the pet toy 10 to project the light beam at various angles depending upon user preference. For example, the locking pin connector may be used to only allow the domed cover 14 to remain open at a fixed number of predefined angles. The predefined angles may be designed to direct the light beam specific distances along a floor and/or at a wall surface. Additionally, a controller may be integrated into the circuit board that only allows the light source 74 to function when the domed cover 14 is secured at these predefined angles. A delay circuit may be added providing a user sufficient time to set the angle of the domed cover 14 and place the pet toy 10 in a desired location before allowing actuation of the light source 74.

The invention has been described with reference to the preferred embodiments. Obviously, modifications and alterations will occur to others upon reading and understanding the preceding detailed description. It is intended that the invention be construed as including all such modifications and alterations insofar as they are within the scope of the appended claims or the equivalents thereof.

Having thus described the preferred embodiments, the invention is now claimed to be:

1. A pet toy comprising:
    a housing having an upper opening and a lower opening;
    a cover pivotally attached to the housing and capable of closing the upper opening, the cover including a reflective material on an underside thereof;
    a light source received within the housing and capable of producing a beam of light directed toward the upper opening;
    an electric motor received within the housing and capable of providing a motion to the light source;
    a power source for powering the light source and the electric motor; and
    a switch located on the housing having an on position allowing the power source to power the light source and the electric motor and an off position preventing the power source from powering the light source and the electric motor, the switch generally biased toward the on position but maintained in the off position when the cover is closed.

2. A pet toy comprising:
    a housing having at least one opening;
    a cover attached to the housing;
    a light source operatively received within one of the cover and the housing, the light source capable of producing a light directed through the at least one opening and the cover capable of closing the at least one opening to substantially prevent light from passing the at least one opening;
    a motor operatively received within one of the housing and the cover and capable of providing a motion to the light source; and
    a switch located on one of the housing and the cover, the switch movable to an on position for allowing a power source to power one or both the light source and the motor and an off position for preventing the power source from powering said one or both the light source and the motor, the switch generally biased toward the on position but maintained in the off position when the cover is closed.

3. The pet toy of claim 2 wherein one of the cover and the housing includes a reflective material capable of reflecting the light produced by the light source.

4. The pet toy of claim 2 wherein the housing includes a lower opening, a bottom cover is removably secured to the housing over the lower opening.

5. The pet toy of claim 4 wherein the bottom cover comprises at least one of a latch and a spring lock for removably securing the bottom cover to the housing.

6. The pet toy of claim 2 further including a power source.

7. The pet toy of claim 2 wherein the light source is an LED light or a laser light.

8. A pet toy comprising:
    a housing having at least one opening thereon;
    a cover attached to the housing, the cover pivotally attached to the housing and including locking angles which allow the cover to remain opened at predetermined angles;
    a light source operatively received within one of the cover and the housing, the light source capable of producing a light directed through one of the at least one opening or from the cover;
    a motor operatively received within one of the housing and the cover and capable of providing a motion to the light source; and
    a switch located on one of the housing and the cover, the switch movable to an on position for allowing a power source to power one or both the light source and the motor and an off position for preventing the power source from powering one or both the light source and the motor.

9. The pet toy of claim 8 wherein a transparent piece is mounted on the housing over an upper opening in the housing and a reflective material is mounted on an underside of the cover capable of reflecting the light produced by the light source.

10. The pet toy of claim 8 wherein the switch is bias toward the on position but remains on the off position when the cover is in a closed position.

11. The pet toy of claim 8 wherein the light source is an LED light or a laser light.

12. A pet toy comprising:
    a housing having an opening;
    a cover pivotally attached to the housing and capable of closing the opening, the cover including a reflective material thereon;
    a light source received within the housing and capable of producing a beam of light directed through the opening and toward the reflective material;

an electric motor received within the housing and capable of providing a motion to the light source;

a power source for powering the light source and the electric motor; and a switch located on the housing having an on position allowing the power source to power the light source and the electric motor and an off position preventing the power source from powering the light source and the electric motor.

13. The pet toy of claim 12 wherein the housing further includes a plurality of radially spaced grip indentations on an outside portion of the housing.

14. The pet toy of claim 12 wherein a timer circuit is received within the housing and operatively connected to the power source and at least one of the electric motor and the light source for limiting continuous power thereto, the timer circuit terminating power to the at least one of the electric motor and the light source if power flows continuously thereto for a predetermined period of time.

15. The pet toy of claim 12 wherein an oscillator chip is received within the housing and operatively connected to the electric motor for stopping and starting rotation of the light source at random intervals thereby varying the pattern of motion of the light source.

16. The pet toy of claim 12 wherein the light source comprises an LED light.

17. The pet toy of claim 12 wherein the light source comprises a laser light.

18. The pet toy of claim 12 wherein the light source includes a delay preventing activation of the light source for a predefined period of time.

19. The pet toy of claim 12 wherein the switch is biased toward the on position but maintained in the off position when the cover is closing the opening.

20. A pet toy comprising:

a body;

a light source for producing a light beam, the light source contained within the body;

reflective material connected to the body, the light beam directed at the reflective material and the reflective material oriented to redirect the light beam, a cover attached to the body, the cover including the reflective material thereon and the cover capable of closing to substantially prevent light from passing from the body;

a motor for providing a motion to the light source thereby moving the light beam relative to the reflective portion; and a switch togglable between an on position whereby the switch permits the light source to receive power and an off position whereby the switch prevents the light source from receiving power.

* * * * *